(12) United States Patent
Youn et al.

(10) Patent No.: US 12,073,310 B2
(45) Date of Patent: Aug. 27, 2024

(54) DEEP NEURAL NETWORK ACCELERATOR WITH INDEPENDENT DATAPATHS FOR SIMULTANEOUS PROCESSING OF DIFFERENT CLASSES OF OPERATIONS

(71) Applicant: Microsoft Technology Licensing, LLC, Redmond, WA (US)

(72) Inventors: Stephen Sangho Youn, Bellevue, WA (US); Lok Chand Koppaka, Bellevue, WA (US); Steven Karl Reinhardt, Vancouver, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 16/837,171

(22) Filed: Apr. 1, 2020

(65) Prior Publication Data
US 2021/0312266 A1   Oct. 7, 2021

(51) Int. Cl.
*G06N 3/063* (2023.01)
*G06F 9/38* (2018.01)
(Continued)

(52) U.S. Cl.
CPC .......... *G06N 3/063* (2013.01); *G06F 9/3836* (2013.01); *G06F 9/3887* (2013.01);
(Continued)

(58) Field of Classification Search
CPC ................................ G06F 9/3836; G06N 3/06
See application file for complete search history.

(56) References Cited

U.S. PATENT DOCUMENTS 8,472,120 B2   6/2013   Border et al.
9,651,784 B2   5/2017   Osterhout
(Continued)

OTHER PUBLICATIONS

"3M™ PRESS-ON™ Aspheric Lens, 90-40300, -3.00 Diopter", Retrieved from: https://www.3m.com/3M/en_US/company-us/all-3m-products/~/3M-PRESS-ON-Aspheric-Lens-90-40300-3-00-Diopter/?N=5002385+3292877990&preselect=8707795+8721756+8722026&rt=rud, Retrieved Date: Apr. 20, 2020, 7 Pages.
(Continued)

*Primary Examiner* — Michael J Metzger
(74) *Attorney, Agent, or Firm* — CALFEE, HALTER & GRISWOLD LLP

(57) ABSTRACT

Deep neural network accelerators (DNNs) with independent datapaths for simultaneous processing of different classes of operations and related methods are described. An example DNN accelerator includes an instruction dispatcher for receiving chains of instructions having both instructions for performing a first class of operations and a second class of operations corresponding to a neural network model. The DNN accelerator further includes a first datapath and a second datapath, where each is configured to execute at least one instruction chain locally before outputting any results. The instruction dispatcher is configured to forward instructions for performing the first class of operations to the first datapath and forward instructions for performing the second class of operations to the second datapath to overlap in time a performance of at least a subset of the first class of operations with a performance of at least a subset of the second class of operations.

20 Claims, 11 Drawing Sheets

(51) Int. Cl.
*G06F 9/48* (2006.01)
*G06F 9/50* (2006.01)
*G06F 17/16* (2006.01)

(52) U.S. Cl.
CPC .......... *G06F 9/4843* (2013.01); *G06F 9/5027* (2013.01); *G06F 17/16* (2013.01)

(56) References Cited

U.S. PATENT DOCUMENTS

| | | | |
|---|---|---|---|
| 9,766,482 | B2 | 9/2017 | Cazalet et al. |
| 10,261,324 | B2 | 4/2019 | Chuang et al. |
| 10,331,445 | B2 | 6/2019 | Fowers et al. |
| 10,338,925 | B2 | 7/2019 | Fowers et al. |
| 10,372,456 | B2 | 8/2019 | Fowers et al. |
| 2016/0342892 | A1* | 11/2016 | Ross ................ G06N 3/063 |
| 2017/0236053 | A1* | 8/2017 | Lavigueur ......... G06N 3/063 706/31 |
| 2018/0052685 | A1* | 2/2018 | Ouyang ............ G06F 9/3016 |
| 2018/0074599 | A1 | 3/2018 | Garcia et al. |
| 2018/0247185 | A1 | 8/2018 | Chung et al. |
| 2018/0247186 | A1 | 8/2018 | Fowers et al. |
| 2018/0247187 | A1 | 8/2018 | Chung et al. |
| 2018/0247190 | A1 | 8/2018 | Chung et al. |
| 2018/0336164 | A1* | 11/2018 | Phelps ............ G06F 9/30036 |
| 2018/0336165 | A1* | 11/2018 | Phelps ............ G06F 9/30014 |
| 2018/0336456 | A1* | 11/2018 | Norrie ................ G06N 3/08 |
| 2019/0050717 | A1* | 2/2019 | Temam ............. G06F 17/16 |
| 2019/0057303 | A1* | 2/2019 | Burger ............... G10L 15/02 |
| 2019/0079302 | A1 | 3/2019 | Ninan et al. |
| 2019/0171419 | A1* | 6/2019 | Takata ................ G06F 5/01 |
| 2019/0236464 | A1* | 8/2019 | Feinson .............. G06N 5/04 |
| 2019/0325296 | A1* | 10/2019 | Fowers .............. G06N 3/063 |
| 2020/0050031 | A1 | 2/2020 | Lu et al. |

OTHER PUBLICATIONS

Erdenebat, et al., "Waveguide-Type Head-Mounted Display System for AR Application", In Journal of State of the art virtual reality and augmented reality knowhow, Mar. 20, 2018, 14 Pages.

Kiyokawa, et al., "An occlusion capable optical see-through head mount display for supporting co-located collaboration", In Proceedings of the Second IEEE and ACM International Symposium on Mixed and Augmented Reality, Oct. 2003, 9 Pages.

Devlin, et al., "BERT: Pre-training of Deep Bidirectional Transformers for Language Understanding," Retrieved from: https://arxiv.org/abs/1810.04805, Retrieved Date: Apr. 20, 2020, 16 pages.

Vaswani, et al., "Attention is All You Need," Retrieved from: https://arxiv.org/abs/1706.03762, Retrieved Date: Apr. 20, 2020, 11 pages.

Chung, et al., "Serving DNNs in Real Time at Datacenter Scale with Project Brainwave", In Proceedings of IEEE Micro, vol. 38, Issue 2, Apr. 20, 2018, 11 Pages.

Fowers, et al., "A Configurable Cloud-Scale DNN Processor for Real-Time AI", In Proceedings of the 45th Annual International Symposium on Computer Architecture, Jun. 2, 2018, 14 Pages.

"International Search Report and Written Opinion Issued in PCT Application No. PCT/US21/018076", Mailed Date: May 31, 2021, 11 Pages.

* cited by examiner

DEEP NEURAL NETWORK ACCELERATOR WITH INDEPENDENT DATAPATHS FOR SIMULTANEOUS PROCESSING OF DIFFERENT CLASSES OF OPERATIONS

BACKGROUND

Neural network technology is used to perform complex tasks such as reading comprehension, language translation, or speech recognition. Although neural networks can perform such tasks, they are expensive to deploy using general purpose CPUs or general-purpose GPUs. In addition, while the GPUs provide increased throughput relative to the CPUs, they have poor latency. Hardware accelerators for accelerating the performance of such tasks are also limited in their ability to improve latency.

SUMMARY

In one example, the present disclosure relates to a deep neural network (DNN) accelerator including an instruction dispatcher configured to receive one or more chains of instructions, where at least one of one or more chains of instructions includes both instructions for performing a first class of operations corresponding to a neural network model and instructions for performing a second class of operations corresponding to the neural network model. The DNN accelerator may further include a first datapath comprising at least one matrix register file and at least one matrix vector multiplier. The DNN accelerator may further include a second datapath, different from the first datapath, comprising at least one vector register file and at least one function unit, where each of the first datapath and the second datapath is configured to execute at least one instruction chain locally before outputting any results, and where the instruction dispatcher is configured to forward at least a first set of instructions for performing the first class of operations to the first datapath and forward at least a second set of instructions for performing the second class of operations to the second datapath, and where the first datapath and the second datapath are configured to overlap in time a performance of at least a subset of the first class of operations corresponding to the first set of the instructions with a performance of at least a subset of the second class of operations corresponding to the second set of the instructions.

In another example, the present disclosure relates to method in a deep neural network (DNN) accelerator including an instruction dispatcher configured to receive one or more chains of instructions, where at least one of one or more chains of instructions includes both instructions for performing a first class of operations corresponding to a neural network model and instructions for performing a second class of operations corresponding to the neural network model, a first datapath comprising at least one matrix register file and at least one matrix vector multiplier, a second datapath, different from the first datapath comprising at least one vector register file and at least one function unit, where each of the first datapath and the second datapath is configured to execute at least one instruction chain locally before outputting any results. The method may include the instruction dispatcher forwarding at least a first set of instructions for performing the first class of operations to the first datapath. The method may further include the instruction dispatcher forwarding at least a second set of instructions for performing the second class of operations to the second datapath. The method may further include using the first datapath and the second datapath overlapping in time a performance of at least a subset of the first class of operations corresponding to the first set of the instructions with a performance of at least a subset of the second class of operations corresponding to the second set of the instructions.

In yet another example, the present disclosure relates to a deep neural network (DNN) accelerator including a first datapath comprising at least one matrix register file and at least one matrix vector multiplier. The DNN accelerator may further include a second datapath, different from the first datapath, comprising at least one vector register file and at least one function unit. The DNN accelerator may further include a switch coupled to both a first local memory associated with the first datapath and to a second local memory associated with the second datapath. The DNN accelerator may further include an instruction dispatcher configured: (1) to access one or more chains of instructions from at least one instruction queue, where at least one of one or more chains of instructions includes both instructions for performing a first class of operations corresponding to a neural network model and instructions for performing a second class of operations corresponding to the neural network model and (2) to split the at least one or more chains of instructions into a first chain comprising instructions for performing only the first class of operations and a second chain comprising instructions for performing only the second class of operations. The instruction dispatcher may further be configured to forward the first chain to the first datapath and forward the second chain to the second datapath, where the first datapath is configured to execute the first chain using the first local memory before outputting any results and the second datapath is configured to execute the second chain using the second local memory before outputting any results, and where the first datapath and the second datapath are further configured to overlap in time a performance of at least a subset of the first class of operations corresponding to the first chain with a performance of at least a subset of the second class of operations corresponding to the second chain.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples disclosed in the present disclosure relate to using system, methods, and components for implementing neural network-based processing. Certain examples relate to Deep Neural Networks (DNNs). A DNN may be any suitable neural network for deep learning. As used herein, the term DNN includes, but is not limited to, any neural network that includes at least two layers between an input layer and an output layer. Certain examples in this disclosure relate to DNN accelerators with independent datapaths for simultaneous processing of different classes of operations. DNN accelerators may be implemented using portions or combinations of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. An image file may be used to configure or re-configure the DNN accelerators such as FPGAs. The image file or similar file or program may be delivered via a network link or a local link (e.g., PCIe) from a host CPU. Information included in an image file can be used to program hardware blocks of a DNN accelerator (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

Certain examples may further relate to DNN accelerators that may be configured to process models that include not only tensor operations (e.g., matrix-vector multiplication operations) but also other heterogeneous nonlinear operations (e.g., softmax). As an example, transformer-based models, such as the Bidirectional Encoder Representations from Transformers (BERT) models, GPT-2 models, and ROBERTa, include multiple classes of operations. Such models may suffer stalls and other performance issues when implemented using functional units arranged in sequential datapaths. Certain examples in this disclosure relate to splitting a sequentially pipelined datapath in a DNN accelerator into multiple independent datapaths according to the types of operation they are responsible for so that multiple classes of DNN operations can execute simultaneously using a single-threaded SIMD programming model with only local communication.

Figure 1:
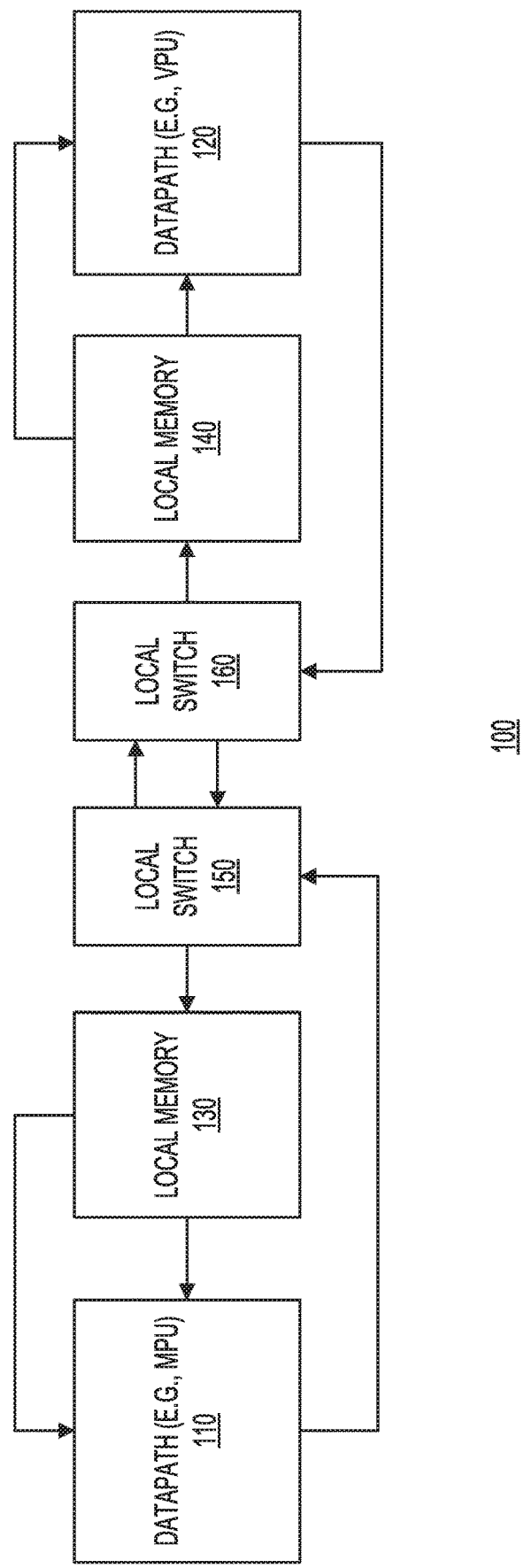
FIG. 1 is a diagram of an architecture of a neural functional unit (NFU) associated with a deep neural network (DNN) accelerator in accordance with one example.

FIG. 1 is a diagram of an architecture of a neural functional unit (NFU) 100 associated with a deep neural network (DNN) accelerator in accordance with one example. NFU 100 may include two independent datapaths, including datapath 110 and datapath 120. In this example, datapath 110 may be configured as a matrix-processing unit (MPU), which may perform tensor operations such as matrix-vector-multiply operations or matrix inversion operations. Datapath 110 may further include a multifunction (MFU) unit for performing activation operations. Datapath 110 may be configured to primarily handle a first class of operations (e.g., matrix-based operations). In this example, datapath 120 may be configured as a vector-processing unit (VPU), which may perform tensor operations such as vector-vector addition operations, vector-vector multiply operations, vector-vector subtraction operations, or other nonlinear operations. Datapath 110 may further be coupled to a local memory 130 and a local switch 150. Datapath 120 may be coupled to a local memory 140 and a local switch 160. The example NFU 100 shown in FIG. 1 advantageously increases the effective utilization of datapaths and decreases the inference latency. This is because NFU 100 of FIG. 1 removes any stalls due to structural hazard by splitting a data-pipe into multiple independent datapaths and allowing instructions to be executed simultaneously and locally with feedback. Thus, as an example, transformer-based models such as the BERT model can adopt the partitioning scheme shown in FIG. 1. Although FIG. 1 shows NFU 100 as having a certain number of components arranged in a certain manner, NFU 100 may include additional or fewer components arranged differently.

Figure 2:
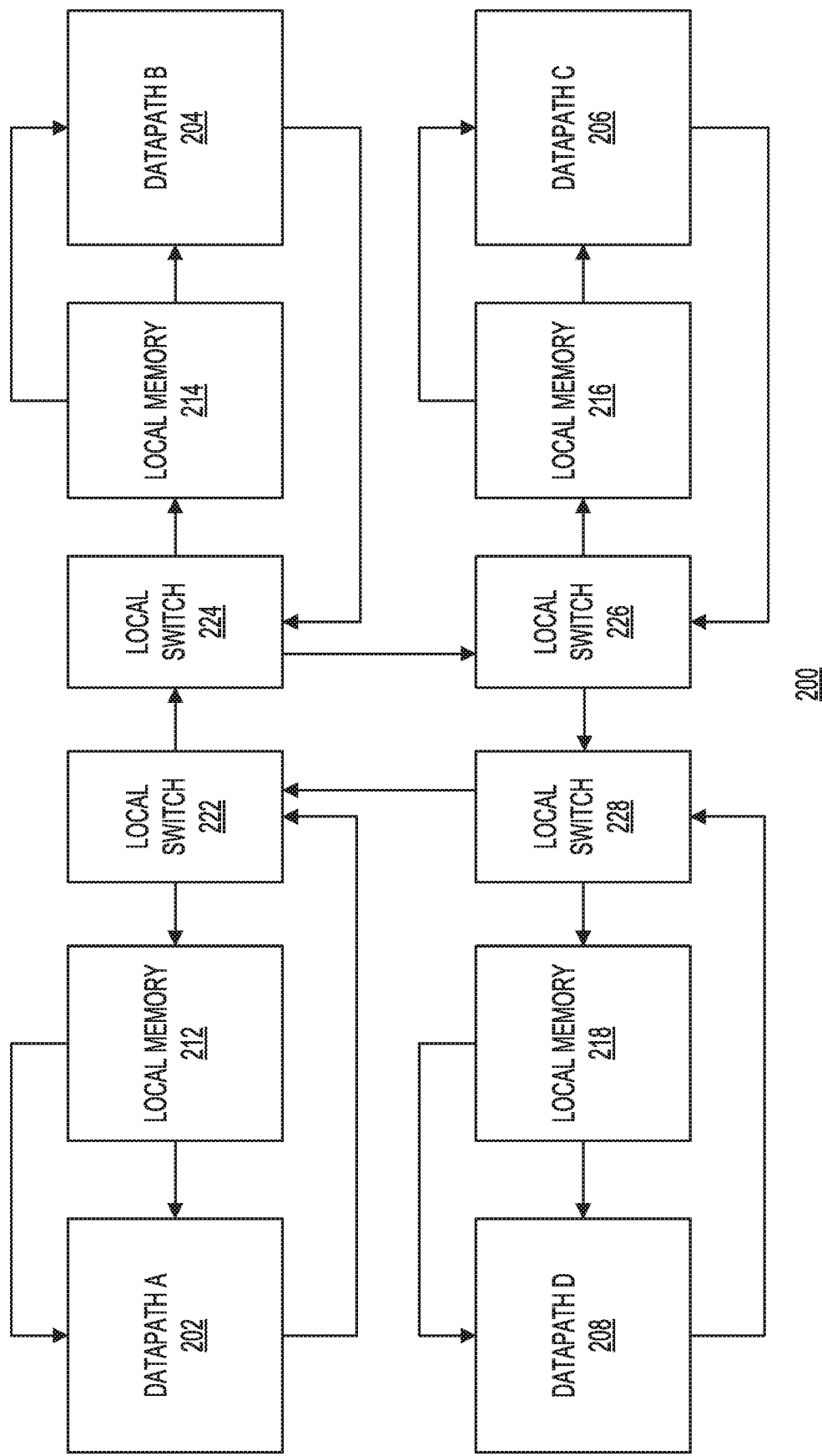
FIG. 2 is a diagram of an architecture of another NFU associated with a DNN accelerator in accordance with one example.

FIG. 2 is a diagram of an architecture of a neural functional unit (NFU) 200 associated with a deep neural network (DNN) accelerator in accordance with one example. As shown in FIG. 2, the partitioning scheme, however, is not limited to only two datapaths; instead, this scheme can be extended to any number of datapaths allowing one to simultaneously run layers requiring matrix-processing and layers requiring vector processing. As an example, each datapath executes several instruction chains in its local loop, exchanges the resulting data at the end through a local switch and repeats these steps. A series of steps may relate to an instruction chain, which may include a set of SIMD instructions in a single-threaded program that starts from a read instruction and ends with a write instruction, including all the in-between data operation instructions (e.g., the matrix-multiplication or the activation operations). This arrangement may maximize utilization of both datapaths whenever there are back-to-back instruction chain streams that use different datapaths. This is because the latency of one chain is hidden from the latency of another chain, decreasing the total inference latency.

With continued reference to FIG. 2, NFU 200 may include four independent datapaths, including datapath A 202, datapath B 204, datapath C 206, and datapath D 208. In this example, each of the datapaths may be configured as a matrix-processing unit (MPU), which may perform tensor operations such as matrix-vector-multiply operations or matrix inversion operations, or may be configured as a vector-processing unit (VPU), which may perform tensor operations such as vector-vector addition operations, vector-vector multiply operations, vector-vector subtraction operations, or other nonlinear operations. Datapath A 202 may further be coupled to a local memory 212 and a local switch 222. Datapath B 204 may further be coupled to a local memory 214 and a local switch 224. Datapath C 206 may further be coupled to a local memory 216 and a local switch 226. Datapath D 208 may further be coupled to a local memory 218 and a local switch 228. Although FIG. 2 shows NFU 200 as having a certain number of components arranged in a certain manner, NFU 200 may include additional or fewer components arranged differently. As an example, the number of datapaths can be extended to any number of datapaths needed for a neural network model.

One benefit of the architecture shown in FIGS. 1 and 2 is the adaptivity of this architecture to heterogeneous operations and its agility/flexibility to a new operator in fast evolving DNN models. Because in such architectures each partitioned datapath is assigned with a specific set of operations, not only can each datapath be better optimized according to its assigned types of operation but also a new type of operator can be incrementally added. As an example, the two-way partitioning described with respect to FIG. 1 may optimize one datapath for heavy tensor operations and the other for nonlinear normalization operations such as softmax and layer-normalization. These advantages may be realized using configurable logic, such as an FPGA, which takes advantage of the more flexible use of the given silicon area. Thus, as an example, depending on the available FPGA resources, each datapath can be configured accordingly and the new datapath can be easily added up with the existing datapath when a new operator needs to be introduced. Besides an FPGA, other types of configurable hardware logic may also be used. As an example, Application Specific Integrated Circuits (ASICs), Erasable and/or Complex programmable logic devices (PLDs), Programmable Array Logic (PAL) devices, and Generic Array Logic (GAL) devices may also be used to implement the datapaths.

Another advantage of the architectures shown in FIGS. 1 and 2 is the localized movements of the data in a distributed memory. Thus, rather than having a complex memory hierarchy, these architectures confine data movement in its local memory during the operation. Thus, each datapath receives/provides input/output from/to its neighbors only, which maps well to the acyclic data flows in DNN models. In contrast, traditional accelerator architectures include a memory hierarchy with caches, which increases the cost of such architectures. In addition, the use of a global shared memory, which necessitates the multiplexing of a large amount of traffic from many cores, adds complexities associated with the shared memory architecture such as synchronization and coherence. Moreover, advantageously, the localized data movement across distributed memory in the proposed architecture helps scalability as it only linearly increases complexity with the addition of partitions or datapaths.

Furthermore, the architectures of the DNN accelerators of the present disclosure also increase energy efficiency since less energy is used by minimizing transactions between the computation units and the external memory. Finally, the architectures described herein preserve the use of single-threaded programming model. This allows easier code generation and additional optimization from a compiler. Moreover, the code does not require synchronization locks and thus alleviates the danger of a deadlock. In contrast, accelerator architecture that depend on multi-threaded or multi-process programming model may require extra efforts to program, to optimize and to verify.

In one example, the present disclosure further relates to a DNN comprising multiple nodes, including DNN accelerators, or groups of such nodes coupled to each other via a low latency network. A converged platform leveraging hundreds to thousands of such nodes (e.g., FPGAs) may advantageously offer: (1) significantly reduced training/inference times from exploiting parallelism across hundreds of thousands of nodes, (2) enabling new training/inference scenarios such as online learning in-situ on live data, and (3) training models of unprecedented scale while leveraging flexible and fungible homogeneous FPGA resources in a hyper-scale datacenter spanning hundreds of thousands of servers. In one example, such advantages may be obtained by exploiting unconventional data representations that may leverage the architecture of nodes, such as FPGAs.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Convolutional Neural Networks (CNNs), Long Short Term Memory (LSTM) neural networks, or Gated Recurrent Unit (GRUs) may be implemented using the systems and nodes described in this disclosure. In one example, the service-related content or other information, such as words, sentences, images, videos, or other such content/information may be translated into a vector representation. The deep learning models may be trained off-line before service initialization and then may be deployed using the systems and nodes described in this disclosure. The nodes may be hardware programmable logic devices that could be customized specifically to perform the types of operations that occur in the context of neural networks, such as DNNs.

In one example, the state of a neural network model and the parameters used to control the model may be stored in the on-chip memories (e.g., BRAMs) of the DNN accelerators (e.g., FPGAs) after they are transferred from an external memory (e.g., a DRAM). The neural network model may be pinned (e.g., preloaded) to the on-chip memories at the service start up time and the contents of the on-chip memories may not be altered unless the model requires alteration or another event that requires reloading the on-chip memories with the model. Thus, in this example, the neural network model may be first accessed from the DRAM associated with the hardware platform, and then loaded directly into the on-chip memories (e.g., BRAMs) of the DNN accelerator.

In one example, the neural network model may comprise of many layers and each layer may be encoded as matrices or vectors of weights expressed in the form of coefficients or constants that have been obtained via off-line training of a neural network. Programmable hardware logic blocks in the nodes may process the matrices or vectors to perform various operations, including multiply, add, and other operations against input vectors representing encoded information related to the service. In one example, the matrices or vectors of weights may be partitioned and pinned across multiple DNN accelerators by using techniques such as graph partitioning. As part of this process, a large neural network may be translated into an intermediate representation (e.g., a graph) and then the intermediate representation may be carved into smaller representations (e.g., sub-graphs) and each of the matrices of weights corresponding to each sub-graph may be pinned to a DNN accelerator's local memory. In one example, the models may be translated into fixed-size matrices and vectors. This way, the DNN accelerator's resources may operate on the fixed-size matrices and vectors in parallel.

Figure 3:
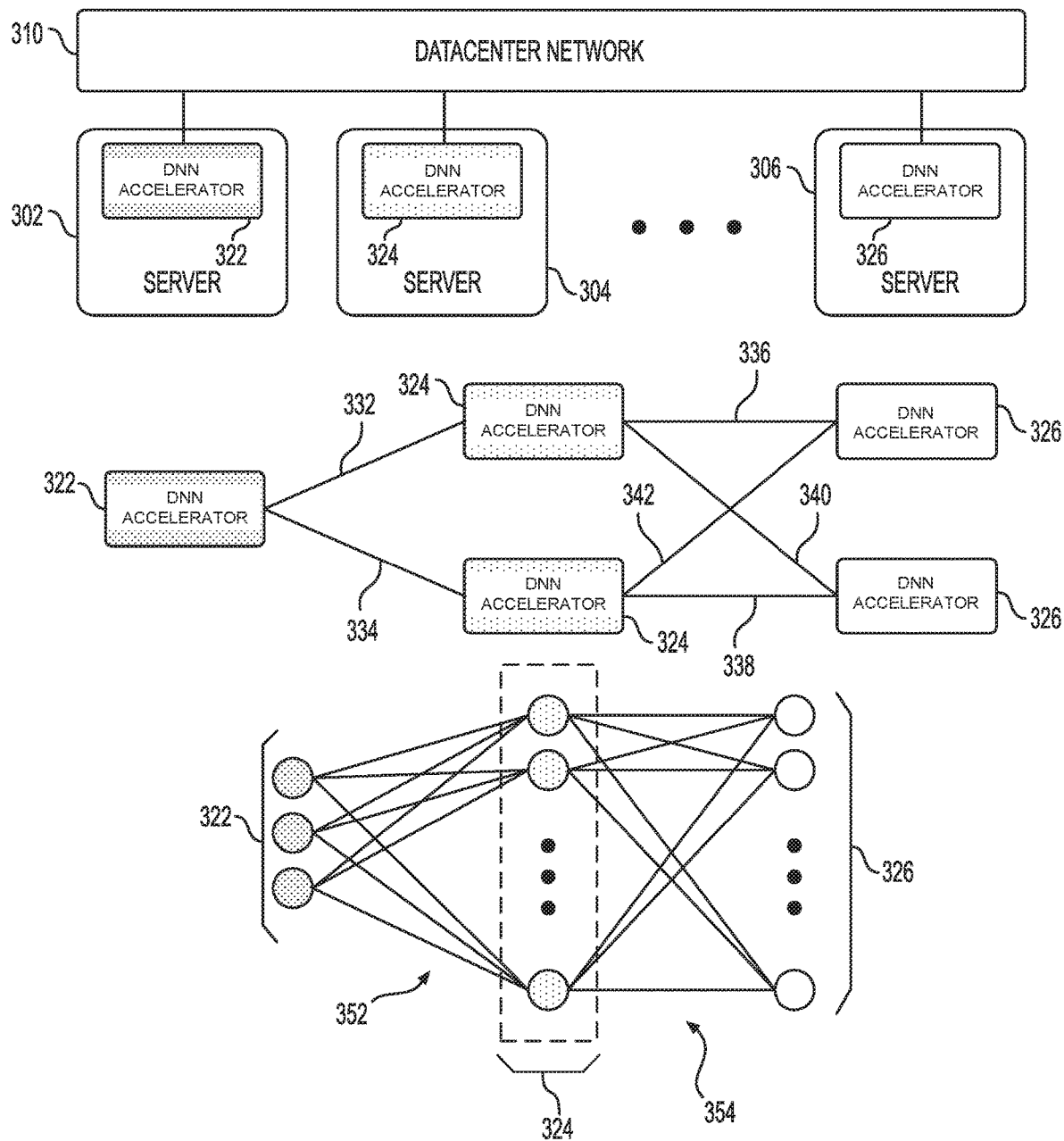
FIG. 3 is a block diagram of a system including DNN accelerators interconnected via a datacenter network in accordance with one example.

FIG. 3 is a block diagram of a system 300 including nodes, including DNN accelerators, interconnected via a datacenter network 310 in accordance with one example. For example, as shown in FIG. 3, multiple nodes 302, 304, and 306 may be coupled via the datacenter network 310. Such nodes may be instantiated and used to parallelize multiple layers of a neural network model, such as a Bidirectional Encoder Representations from Transformers (BERT) model. In one example, each node may be implemented as a server and may further include at least one DNN accelerator. Thus, node 302 may include DNN accelerator 322, node 304 may include DNN accelerator 324, and node 306 may include DNN accelerator 326. The DNN accelerators may be interconnected via a lightweight transport layer protocol-based system. In one example, a first instance of DNN accelerator 322 may be coupled via a transport link 332 with a first instance of DNN accelerator 324 and the first instance of DNN accelerator 322 may further be coupled via transport link 334 with the second instance of DNN accelerator 324. The first instance of DNN accelerator 324 may be coupled via a transport link 336 with a first instance of DNN accelerator 326 and the first instance of DNN accelerator 324 may further be coupled via transport link 340 with a first instance of DNN accelerator 326. Similarly, the second instance of DNN accelerator 324 may be coupled via a transport link 342 with the first instance of DNN accelerator 326 and the second instance of DNN accelerator 324 may further be coupled via a transport link 338 with the second instance of DNN accelerator 326. The lightweight transport layer protocol may provide the DNN accelerators with the ability to transfer or receive packets or other such data from each other via datacenter network 310.

With continued reference to FIG. 3, the DNN accelerators may be interconnected in other configurations as well. For example, several instances of DNN accelerator 322 may be coupled via multiple transport links 352 to several instances of DNN accelerator 324. Similarly, several instances of DNN accelerator 324 may be coupled via transport links 354 to several instances of DNN accelerator 326. Although FIG. 3 shows a certain number and arrangement of nodes, including DNN accelerators, there could be more, or fewer number of nodes arranged differently.

Figure 4:
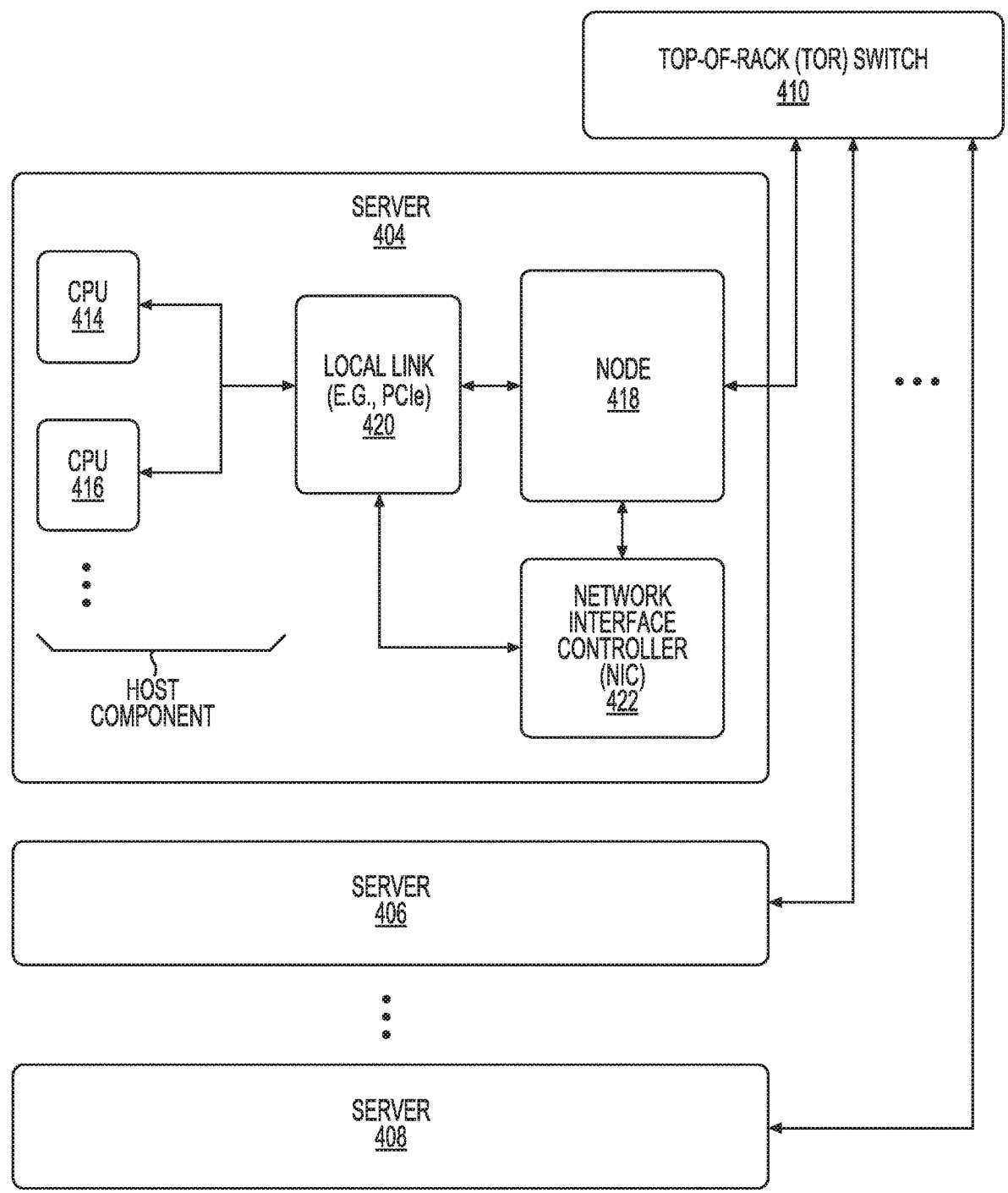
FIG. 4 is a block diagram of a system including a DNN accelerator in accordance with one example.

FIG. 4 is a block diagram of a system 400 including distributed nodes in accordance with one example. In this example, the multiple nodes may be implemented as a rack of servers in a datacenter. Each of the servers can be coupled to a top-of-rack (TOR) switch 410. Other racks, although not shown, may have a similar configuration. Each server may include at least one node or multiple nodes. Each node may include a server (e.g., server 404, server 406, or server 408) and each server may be coupled to a TOR switch (e.g., TOR switch 410). Server 404 may include a host component including CPUs, such as CPU 414 and CPU 416, which may be coupled via a local link (e.g., PCIe) 420 to a node 418, including a DNN accelerator. Each node 418 may also be coupled by way of a network interface controller 422 (e.g., used to communicate across the network infrastructure for the data center). The system shown in FIG. 4 may allow nodes to perform processing on messages that are received from (and/or sent to) TOR switch or other switches. Using this example system, individual nodes may send messages comprising packets directly to each other and thus this may allow the partitioning of even a single neural network across multiple DNN accelerators. For communicating the nodes may use a lightweight protocol, including, for example, RDMA. Although FIG. 4 shows a certain number of components of the system arranged in a certain manner, there could be more, or fewer number of components arranged differently.

Figure 5:
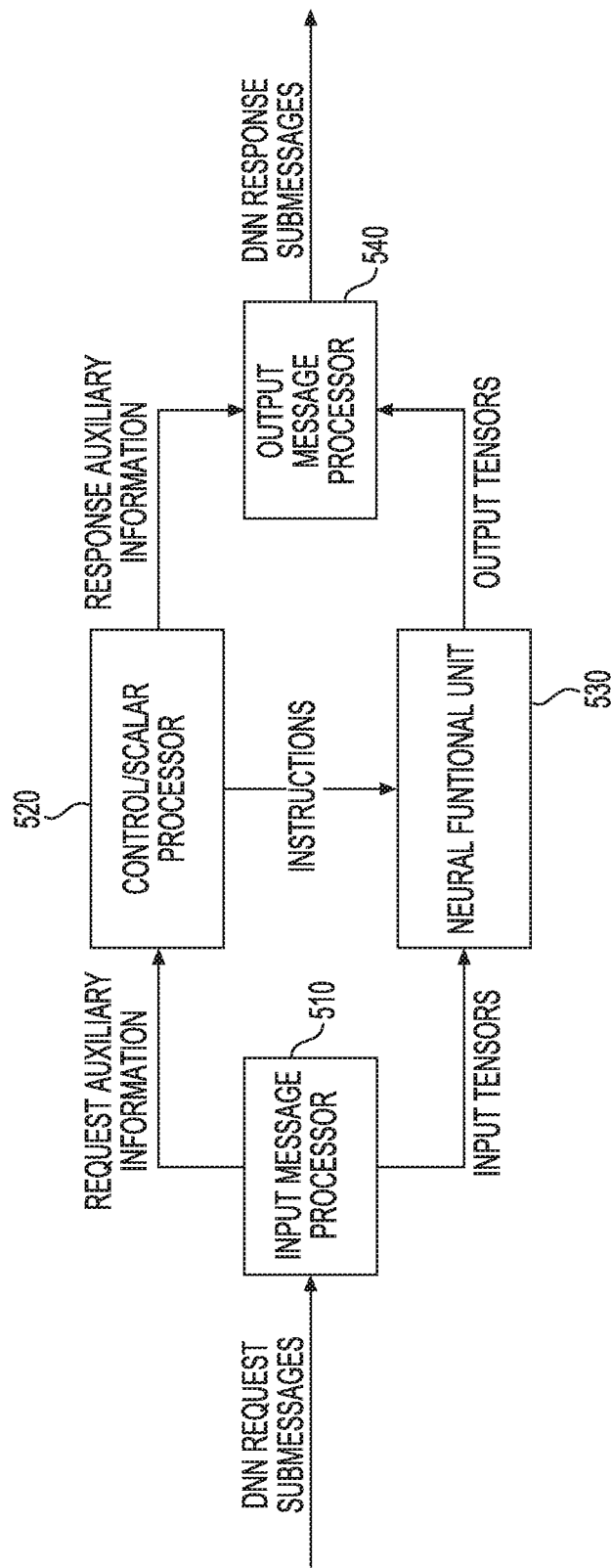
FIG. 5 is a block diagram of a DNN accelerator in accordance with one example.

FIG. 5 is a block diagram of a DNN accelerator 500 in accordance with one example. Each DNN accelerator 500 may include an Input Message Processor (IMP) 510 for receiving messages from other nodes and an Output Message Processor (OMP) 540 for processing outgoing message to other nodes or components. Each DNN accelerator 500 may further include control/scalar processor (CSP) 520 and a neural functional unit (NFU) 530. Although not shown, the received messages received by a DNN accelerator 500 may be stored in at least two different queues: (1) IMP-to-CSP Auxiliary Queue and (2) IMP-to-NFU Data Queue. Although not shown, the outgoing messages may be stored in at least two different queues: (1) CSP-to-IMP Auxiliary Queue and (2) NFU-to-OMP Data Queue. In this example, DNN accelerator 500 may accept off-chip messages containing both auxiliary information such as control and scalar data and payload data (e.g., vectors, matrices, or other tensor data structures). The auxiliary information may include a request to perform computationally intensive operations on the payload, and then return a result in the form of an output message. In this example, the incoming messages are handled by a lightweight input message processor (IMP) 510, which sends auxiliary information to control/scalar processor (CSP) 520 and payload data (e.g., input tensors) to neural functional unit (NFU) 530. As an example, CSP 520 may then interpret the request, and based on its firmware, may send a series of instructions to NFU 530. After a certain processing latency, the NFU may produce the result of the request, which may be combined with auxiliary data produced by CSP 520 in a lightweight output message processor (OMP) 540 and then sent off-chip. CSP firmware may provide instructions to NFU 530. The input messages may arrive from many sources (including over the network). IMP 510 may examine the head of the queue of the messages and it can dequeue any instructions that need to be performed and feed it through the system. Although FIG. 5 shows a certain number of components of the example DNN accelerator 500 arranged in a certain manner, there could be more, or fewer number of components arranged differently.

With continued reference to FIG. 5, as an example, the NFU 530 may be implemented based on the architecture shown in FIG. 1 or FIG. 2. In this example, the primary goal of the NFU is to perform matrix multiplications at high throughput and low latency with its matrix-processing unit (MPU) and to perform vector operations such as sigmoid operations using its vector-processing unit (VPU). The NFU may receive matrices of coefficients (e.g., constants) and multiply these coefficients with the dynamic input vector data. In one example, the coefficients may be loaded at the service startup time from an off-chip memory (e.g., a DRAM) into the on-chip memories (e.g., block random access memories (BRAMs) of FPGAs) corresponding to NFU 530.

Figure 6:
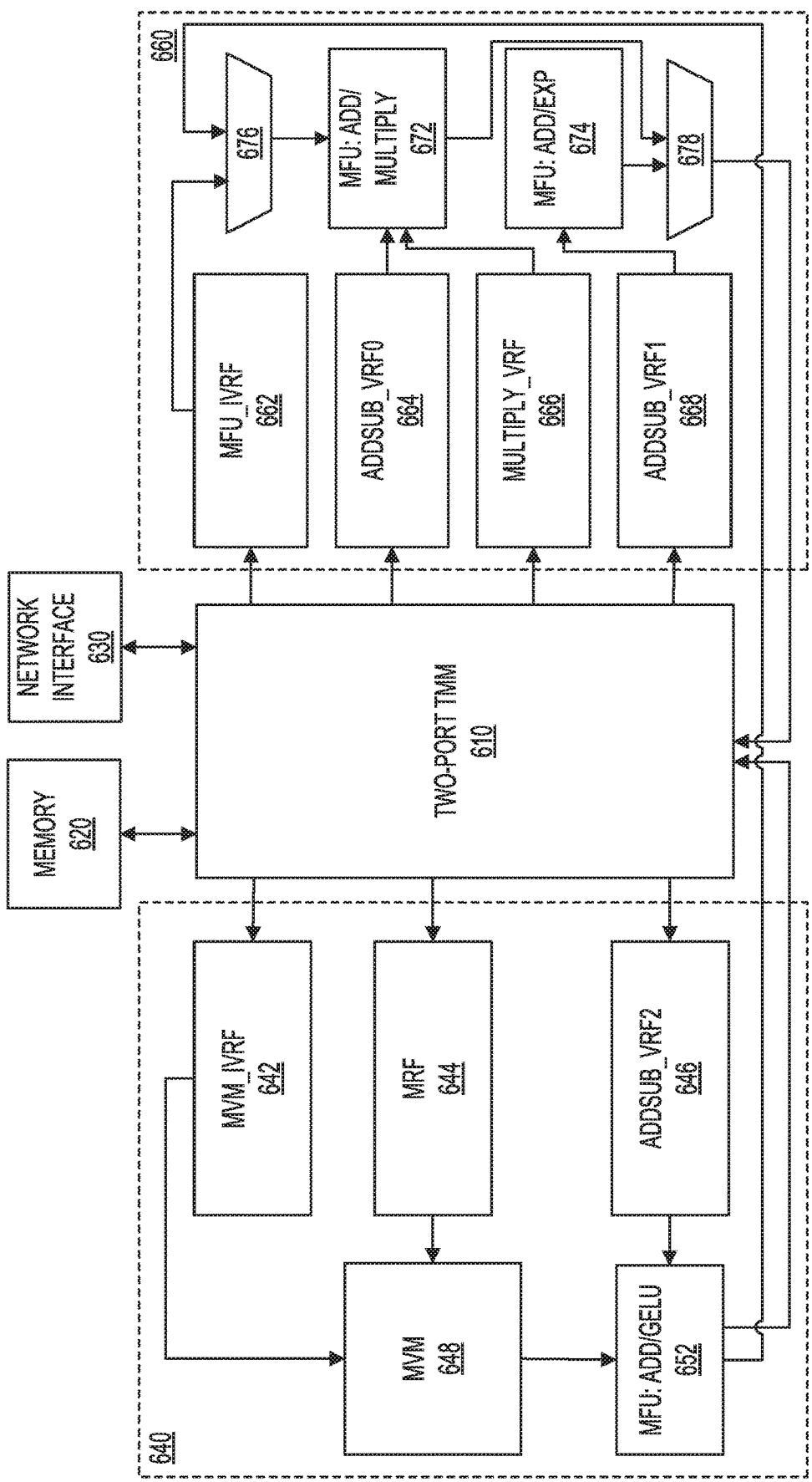
FIG. 6 is a block diagram of a neural functional unit in accordance with one example.

FIG. 6 shows an example implementation of an NFU 600. In this example, NFU 600 may include datapath 640 and datapath 660 coupled via a local switch (e.g., two-port tensor memory manager (TMM) 610). Two-port TMM 610 may further be coupled to a memory 620 and a network interface 630. Memory 620 may be implemented using any suitable memory, including DRAM. Network interface 630 may allow NFU 600 to receive, or send, instructions or data via a datacenter network or another type of network. Each datapath may include different functional units, including units such as matrix-vector-multipliers and multifunction units. Each such unit may include a command FIFO, which may issue commands in-order. In this example, two-port TMM 610 may ensure that any tensors output from any of the datapaths are forwarded in the order of issued commands. As an example, the tensors provided by datapath 640 may arrive as an input for datapath 660 as soon as an instruction chain completes its operations. Two-port TMM 610 may ensure that the output tensors are provided to datapath 660 in order. In one example, two-port TMM 610 may be implemented as a two-port interconnect. Two-port TMM 610 may be implemented as a switching fabric or in the form of any other logic. As an example, when implemented as part of an FPGA, two-port TMM 610 may be implemented by reconfiguring the interconnects and configurable logic blocks of the FPGA.

Datapath 640 may include several register files for storing instructions and matrix data or vector data. As an example, datapath 640 may include a matrix-vector-multiply initial vector register file (MVM_IVRF) 642, a matrix register file (MRF) 644, and an addition/subtraction vector register file (ADDSUB_VRF2) 646. Each of these register files may act as a local memory for datapath 640. Datapath 640 may further include a matrix-vector-multiplier (MVM) 648. Datapath 640 may further include a multifunction unit (MFU: ADD/GELU 652) for performing addition or activation operations (e.g., Gaussian Error Linear Unit (GELU)) operations. Instructions from MVM_IVRF 642 may be provided to matrix-vector-multiplier (MVM) 648. MVM 648 may perform matrix-vector multiplication operations as part of performing inference based on a neural network model, such as the BERT model. Thus, in this example, a DNN accelerator incorporating NFU 600 may be used to accelerate inference in the BERT model. In this example, MFU: ADD/GELU 652 may perform nonlinear operations on the intermediate results generated by MVM 648. Although not shown in FIG. 6, each of the hardware blocks for performing operations on data, including MVM 648 and MFU: ADD/GELU 652, may include local decoders to decode the received instructions and perform the operations on the data received via MRF 644 and ADDSUB_VRF2 646, respectively.

With continued reference to FIG. 6, Datapath 660 may include several register files for storing instructions and vector data. As an example, datapath 660 may include a multifunction unit instruction vector register file (MFU_IVRF) 662, an addition/subtraction vector register file (ADDSUB_VRF0) 664, a multiplication vector register file (MULTIPLY_VRF) 666, and another addition/subtraction vector register file (ADDSUB_VRF1) 668. Each of these register files may act as a local memory for datapath 660. Datapath 660 may further include a multifunction unit for performing addition/multiplication operations (MFU: ADD/MULTIPLY) 672. Datapath 660 may further include a multifunction unit for performing addition/exponential operations (MFU: ADD/EXP) 674. Instructions from MFU_IVRF 662 may be provided to MFU: ADD/MULTIPLY 672. MFU: ADD/MULTIPLY 672 may perform nonlinear operations as part of performing inference based on a neural network model, such as the BERT model. MFU: ADD/EXP 674 may perform addition and activation operations. As shown in FIG. 6, the presence of multiple vector register files and associated functional units ensures efficient processing. As an example, an addition operation (e.g., using MFU: ADD/EXP 674) may be performed after a multiplication operation (e.g., using MFU: ADD/MULTIPLY 672). Although not shown in FIG. 6, additional units may be provided to include more flexibility, such as performing an additional operation and then performing a multiply operation. Although not shown in FIG. 6, each of the hardware blocks for performing operations on data, including MFU: ADD/MULTIPLY 672 and MFU: ADD/EXP 674, may include local decoders to decode the received instructions and perform the operations on the data received via any of the vector register files that these blocks are coupled to.

Still referring to FIG. 6, NFU 600 may further include a multiplexer 676. One of the inputs to multiplexer 676 may receive output from MFU_IVRF 662 and the second input to multiplexer 676 may receive output from datapath 640. This way, datapath 660 may receive intermediate results from datapath 640 as an input. A control signal (not shown) may select the input that is coupled to the output of multiplexer 676. NFU 600 may further include another multiplexer 678. One of the inputs to multiplexer 678 may receive output from MFU: ADD/MULTIPLY 672 and the second input to multiplexer 676 may receive output from MFU: ADD/EXP 674. This way, in this example, the output of any of the MFUs may be provided as an input to two-port TMM 610, which in turn may forward the results of the computations performed by either of the two MFUs. A control signal (not shown) may select the input that is coupled to the output of multiplexer 678. Although FIG. 6 shows a certain number of components of NFU 600 arranged in a certain manner, there could be more, or fewer number of components arranged differently. As an example, NFU 600 may include additional datapaths and local switches. In addition, as an example, a datapath may include additional hardware blocks, which may perform operations on values or operands received from several sources, including, for example, the memory, the network, or another datapath. As an example, a block may perform a tangent (e.g., TANH) operation. Another block may perform a sigmoid (SIGM) operation. In addition, as needed, the outputs of the various hardware blocks may be supplied to a multiplexer. Based on a control signal or control signals from the various queue controllers or other control logic, a multiplexer may provide an output, which may be coupled to the next hardware block or to the output queue. In one example, the control signal may be a signal received from an instruction decoder corresponding to the neural functional unit (NFU). As the instructions are executed, they may fan out into independent control queues and that may determine which part of NFU 600 gets activated.

Figure 7:
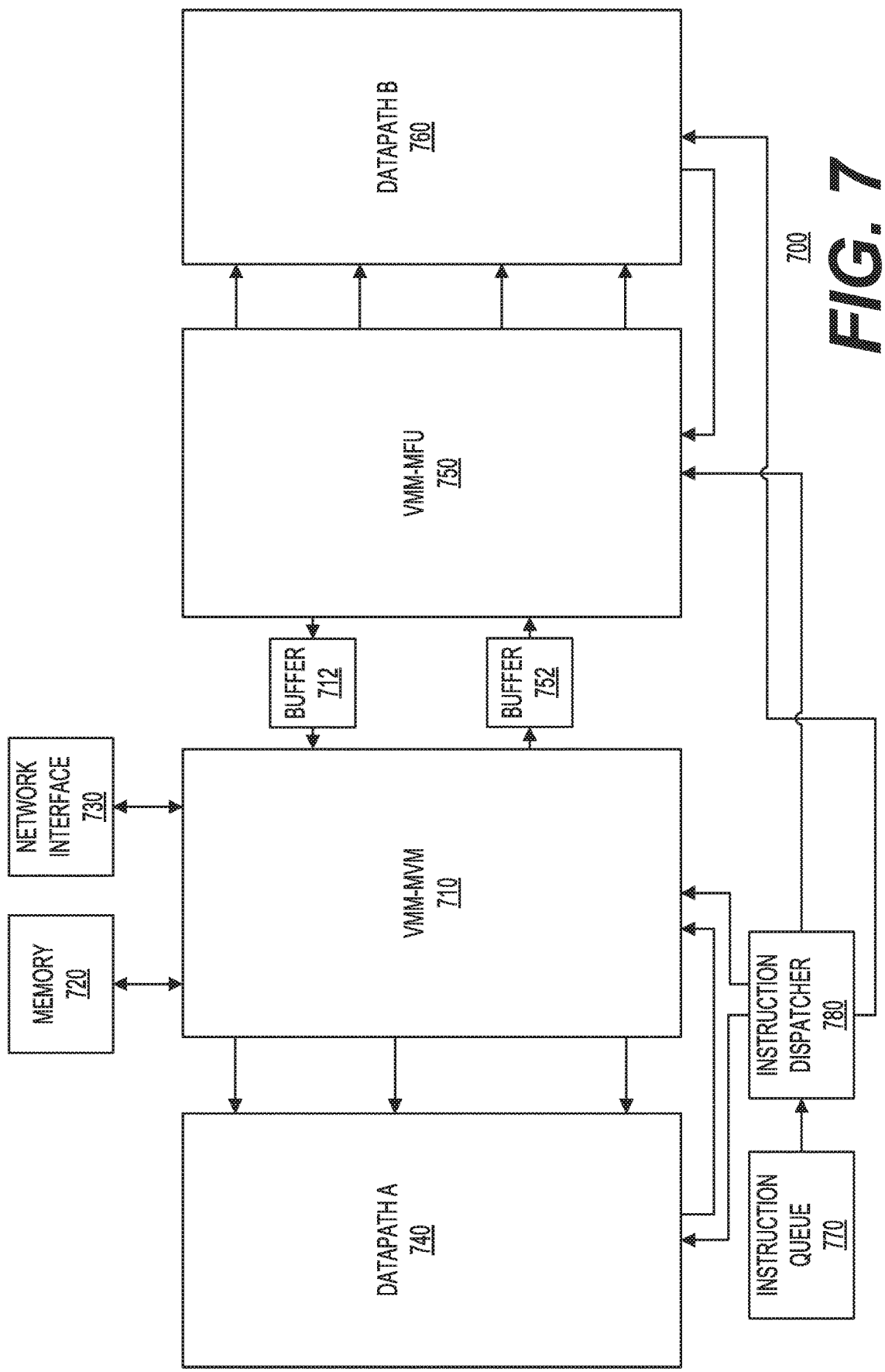
FIG. 7 is a block diagram of another neural function unit in accordance with one example.

FIG. 7 shows an example implementation of an NFU 700. In this example, NFU 700 may include datapath A 740 and datapath B 760. Datapath A 740 may include similar components as described earlier with respect to datapath 640 of FIG. 6. Similarly, datapath B 760 may include similar components as described earlier with respect to datapath 660 of FIG. 6. NFU 700 may further include two local switches; one of which may be implemented as a vector memory manager (VMM) for the matrix-vector-multiplier (MVM) (e.g., VMM-MVM 710) and a another one of which may be implemented as a vector memory manager (VMM) for the multifunction unit(s) (MFU(s)) (e.g., VMM-MFU 750). VMM-MVM 710 may further be coupled to a memory 720 and a network interface 730. Memory 720 may be implemented using any suitable memory, including DRAM. Network interface 730 may allow NFU 700 to receive, or send, instructions or data via a datacenter network or another type of network.

With continued reference to FIG. 7, instructions corresponding to one or more layers associated with a neural network may be queued in an instruction queue 770. An instruction dispatcher 780 may provide instructions and control signals to each of the datapaths, including datapath A 740 and datapath B 760. Instruction dispatcher 780 may also control the operation of VMM-MVM 710 and VMM-MFU 750. In this manner, instruction dispatcher 780 may synchronize the operations being performed by the various components of NFU 700. As an example, instruction dispatcher 780 may provide chains of instructions for execution by each datapath. As explained earlier, each datapath (e.g., datapath A 740 and datapath B 760) may execute several instruction chains in its local loop, and exchange the resulting data at the end through a local switch (e.g., VMM-MVM 710 and VMM-MFU 750) and repeat these steps, as needed. A series of steps may relate to an instruction chain, which may include a set of SIMD instructions in a single-threaded program that starts from a read instruction and ends with a write instruction, including all the in-between data operation instructions (e.g., the matrix-multiplication or the activation operations). The matrix/vector register files may act as a local memory for each datapath for performing these operations. This arrangement may maximize utilization of both datapaths whenever there are back-to-back instruction chain streams that use different datapaths. This is because the latency of one chain is hidden from the latency of another chain, decreasing the total inference latency.

In addition, a datapath may provide intermediate results to another datapath via the local switch and any buffers needed for buffering the results. Thus, as shown in FIG. 7, datapath A 740 may provide intermediate results via VMM-MVM 710 and buffer 752 to datapath B 760. Similarly, datapath B 760 may provide intermediate results via VMM-MFU 750 and buffer 712 to datapath A 740. Although FIG. 7 shows a certain number of components of NFU 700 arranged in a certain manner, there could be more, or fewer number of components arranged differently. As an example, NFU 700 may include additional datapaths and local switches.

In terms of one example instruction set architecture (ISA) related to the nodes including the NFUs, the instructions may always execute in program order. In addition, all instructions may act on vectors and/or matrices of the native size. The ISA may be used to expose both the distributed memory system and the massive pipeline parallelism available in the NFU. In one example, this parallelism may be exploited by executing instructions chains in parallel. Most instructions may take the same general set of arguments: a source, a destination, and optionally a second source. As an example, with respect to NFU 700 of FIG. 7, each of the local switches may process instructions that include as arguments both a source (SRC) and a destination (DEST). The sources from which a local switch may receive operands or instructions may depend on the type of instructions that the corresponding datapath is configured to handle. Similarly, the destinations to which a local switch may output instructions or operands may depend on the type of instructions that the corresponding datapath is configured to handle. As an example, the sources of the operands or instructions for VMM-MVM 710 may include memory 720, network interface 730, and the control logic associated with NFU 700. The destinations for the operands and instructions for VMM-MVM 710 may include MVM_IVRF 642 of FIG. 6, ADDSUB_VRF2 646 of FIG. 6, MRF 644 of FIG. 6, and other relevant components, such as a matrix memory manager (not shown). As an example, the sources of the operands or instructions for VMM-MFU 750 may include a service processor unit (e.g., control/scalar processor 520 of FIG. 5) and the control logic associated with NFU 700. The destinations for the operands and instructions for VMM-MFU 750 may include a service processor unit (e.g., control/scalar processor 520 of FIG. 5), network interface 730, MFU_IVRF 662 of FIG. 6, ADDSUB_VRF0 664 of FIG. 6, MULTIPLY_VRF 666 of FIG. 6, ADDSUB_VRF1 668 of FIG. 6, MFU: ADD/MULTIPLY 672 of FIG. 6, and MFU: ADD/EXP 674 of FIG. 6.

In one example, the programs may be compiled or structured to attempt to chain as many instructions together as possible to maximize performance. Instructions may be chained together based on forwarding of intermediate results to the next instruction in an implicit manner. Alternatively, a pair of instructions can be chained together by asserting a forward flag in the first instruction's destination argument and by asserting a receive flag in place of a source address argument in the second instruction. The chain continues until an instruction does not assert forward, or all functional units in the NFU have already been used in the chain. Thus, in this example, it is illegal to assert forward in one instruction and then not assert receive in the following instruction (and vice versa). Instructions may be mapped to the NFU's datapaths by their resource requirements. For example, matrix-vector multiply can only take place in the datapath having a matrix-vector unit (MVU), whereas vector-vector add can only take place in the datapath having a multifunction unit (MFU).

A node service may communicate with each node including the control/scalar processor (CSP) and the NFU using an application programming interface (API). The API may be used to send instructions to the NFU and to accept/formulate requests/responses to the network. A node service may receive a request from the network, launch a subroutine with arguments from the request, and then send a response back over the network. In this example, a request may include a node header, which is interpreted by the CSP, along with a payload, which is forwarded to the NFU. Likewise, outgoing responses may have a node header and (optional) payload. Each subroutine may be a series of API calls that perform matrix and vector operations. Each of these API calls may correspond to an NFU instruction, and when the CSP encounters one of these API calls it may send that instruction to the NFU.

Certain types of neural network modes that are transformer-based models may particularly benefit from an increase in performance when using NFU 600 of FIG. 6 or NFU 700 of FIG. 7 for deep neural network acceleration. One of the transformer-based models is the Bidirectional Encoder Representations from Transformers (BERT) model, which includes multiple classes of operations. Such models may suffer stalls and other performance issues when implemented using functional units arranged in sequential datapaths. The BERT model may be used for word completions for sentences and other natural language processing (NLP) related problems. BERT models may be used to learn contextual relations between words in a text. A BERT model may comprise input stages, including an embedding layer and a post process layer. A BERT model may further include transformers and a decode/loss layer. The embedding layer may convert each input token (e.g., a word in a sequence) into a vector representation. Vector size may be a 768-dimension vector or a 1024-dimension vector. Post process layer may perform additional operations, including position embedding, sentence embedding, and token masking. Position embedding may be used to show token positions within a sequence. Sentence embedding may be used to map sentences to vectors. Token masking may include replacing a certain percentage of the words in each sequence with a mask token. Decode/loss layer may produce predictions based on the training.

A BERT model-based neural network may include several transformer layers. Each transformer layer may convert input sequences into output sequences using self-attention. A transformer may include fully-connected network (FCN) layers, including FCN (Query), FCN (Key), and FCN (Value). Self-attention may map a query and a set of key-value pairs to an output. Attention function may be implemented using a softmax MFU. Transformers may further include additional fully-connected network (FCN) layers, such as feed-forward layers. In terms of the complexity of operations associated with the transformers, fully connected layers are the dominant factors in terms of the performance of the model.

To further explain the operation of NFU 600 and NFU 700, Table 1 below shows a chain of instructions including pseudocode corresponding to the various layers of the BERT model.

TABLE 1

Instruction Chain

| | |
|---|---|
| 1. | q[1], q[2] = linear(x, MVM_IVRF, MVM_IVRF) |
| 2. | k[1], k[2] = linear(x, MVM_IVRF, MVM_IVRF) |
| 3. | v[1], v[2] = linear(x, MVM_IVRF, MVM_IVRF) |
| 4. | s[1] = score(q[1], k[1], MVM_IVRF, MFU_IVRF) |
| 5. | p[1] = softmax(s[1], MFU_IVRF, MVM_IVRF) |
| 6. | z[1] = context(p[1], v[1], MVM_IVRF, MVM_IVRF) |
| 7. | s[2] = score(q[2], k[2], MVM_IVRF, MFU_IVRF) |
| 8. | p[2] = softmax(s[2], MFU_IVRF, MVM_IVRF) |
| 9. | z[2] = context(p[2], v[2], MVM_IVRF, MVM_IVRF) |
| 10. | q[3], q[4] = linear(x, MVM_IVRF, MVM_IVRF |
| 11. | k[3], k[4] = linear(x, MVM_IVRF, MVM_IVRF) |
| 12. | v[3], v[4] = linear(x, MVM_IVRF, MVM_IVRF) |
| 13. | s[3] = score(q[3], k[3], MVM_IVRF, MFU_IVRF) |
| 14. | p[3] = softmax(s[3], MFU_IVRF, MVM_IVRF) |
| 15. | z[3] = context(p[3], v[3], MVM_IVRF, MVM_IVRF) |
| 16. | s[4] = score(q[4], k[4], MVM_IVRF, MFU_IVRF) |
| 17. | p[4] = softmax(s[4], MFU_IVRF, MVM_IVRF) |

Prior to processing the instructions shown in Table 1 using NFU 600 or NFU 700, the instructions in the instruction chain may be rearranged for execution. The rearrangement may be performed to take advantage of the independent datapaths of an NFU that can be used to perform certain operations in parallel. Table 2 below shows a rearranged instruction chain for use with NFU 600 or NFU 700.

TABLE 2

Rearranged Instruction Chain

| | |
|---|---|
| 1. | q[1], q[2] = linear(x, MVM_IVRF, MVM_IVRF) |
| 2. | k[1], k[2] = linear(x, MVM_IVRF, MVM_IVRF) |
| 3. | v[1], v[2] = linear(x, MVM_IVRF, MVM_IVRF) |
| 4. | s[1] = score(q[1], k[1], MVM_IVRF, MFU_IVRF) |
| 5. | s[2] = score(q[2], k[2], MVM_IVRF, MFU_IVRF) |
| 6. | q[3], q[4] = linear(x, MVM_IVRF, MVM_IVRF) |
| 7. | p[1] = softmax(s[1], MFU_IVRF, MVM_IVRF) |
| 8. | k[3], k[4] = linear(x, MVM_IVRF, MVM_IVRF) |
| 9. | v[3], v[4] = linear(x, MVM_IVRF, MVM_IVRF) |
| 10. | p[2] = softmax(s[2], MFU_IVRF, MVM_IVRF) |
| 11. | s[3] = score(q[3], k[3], MVM_IVRF, MFU_IVRF) |
| 12. | s[4] = score(q[4], k[4], MVM_IVRF, MFU_IVRF) |
| 13. | z[1] = context(p[1], v[1], MVM_IVRF, MVM_IVRF) |
| 14 | z[2] = context(p[2], v[2], MVM_IVRF, MVM_IVRF) |

TABLE 2-continued

Rearranged Instruction Chain

| | |
|---|---|
| 15 | q[5], q[6] = linear(x, MVM_IVRF, MVM_IVRF) |
| 16. | p[3] = softmax(s[3], MFU_IVRF, MVM_IVRF) |

In the example of the instruction chains described with respect to Table 1 and Table 2, certain instructions are configured to perform linear operations (indicated by the linear label in the pseudocode) and the other instructions are configured to perform nonlinear operations (indicated by the an absence of the linear label in the pseudocode). These instructions correspond to performing inference using the BERT model, which uses multi-head attention as part of the transformers. This example assumes that the multi-head attention relates to twelve-head attention, in which twelve attention layers running in parallel may perform scaled dot-product attention computations. Each scaled dot-product input may consist of queries and keys, which may be subjected to dot-product multiplication operations, and then scaled. In this example, a softmax function may be applied to the scaled outputs to obtain the weights on the values. This example assumes that queries are packed together in a matrix Q, keys are packed together in a matrix K, and values are packed together in a matrix V.

As an example, instruction 1 in Table 2 (q[1], q[2]=linear (x, MVM_IVRF, MVM_IVRF)) is labeled as a linear instruction that corresponds to performing matrix operations on queries q[1] and q[2], where the numbers 1 and 2 correspond to the index for the head. In addition, for this instruction, both the source and the destination of operands is the vector register file associated with the matrix-vector-multiplier (e.g., MVM_IVRF 642 of FIG. 6). Instruction 2 in Table 2 (k[1], k[2]=linear(x, MVM_IVRF, MVM_IVRF)) is also labeled as a linear instruction that corresponds to performing matrix operations on keys k[1] and k[2], where the numbers 1 and 2 correspond to the index for the head. Instruction 3 in Table 2 (v[1], v[2]=linear(x, MVM_IVRF, MVM_IVRF)) is also labeled as a linear instruction that corresponds to performing matrix operations on values v[1] and v[2], where the numbers 1 and 2 correspond to the index for the head. Table 2 includes several other instructions that are labeled as linear. Table 2 also includes, as part of the instruction chain, several nonlinear instructions. As an example, instruction 7 in Table 2 (p[1]=softmax(s[1], MFU_IVRF, MVM_IVRF)) corresponds to a nonlinear operation: softmax, which is performed using a different datapath—for example, datapath 660 of FIG. 6. Although the instructions chains described above include a respective set of instructions to illustrate the various embodiments, the respective sets of instructions may include more or fewer instructions. In addition, these instructions may be performed in a different order.

Figure 8:
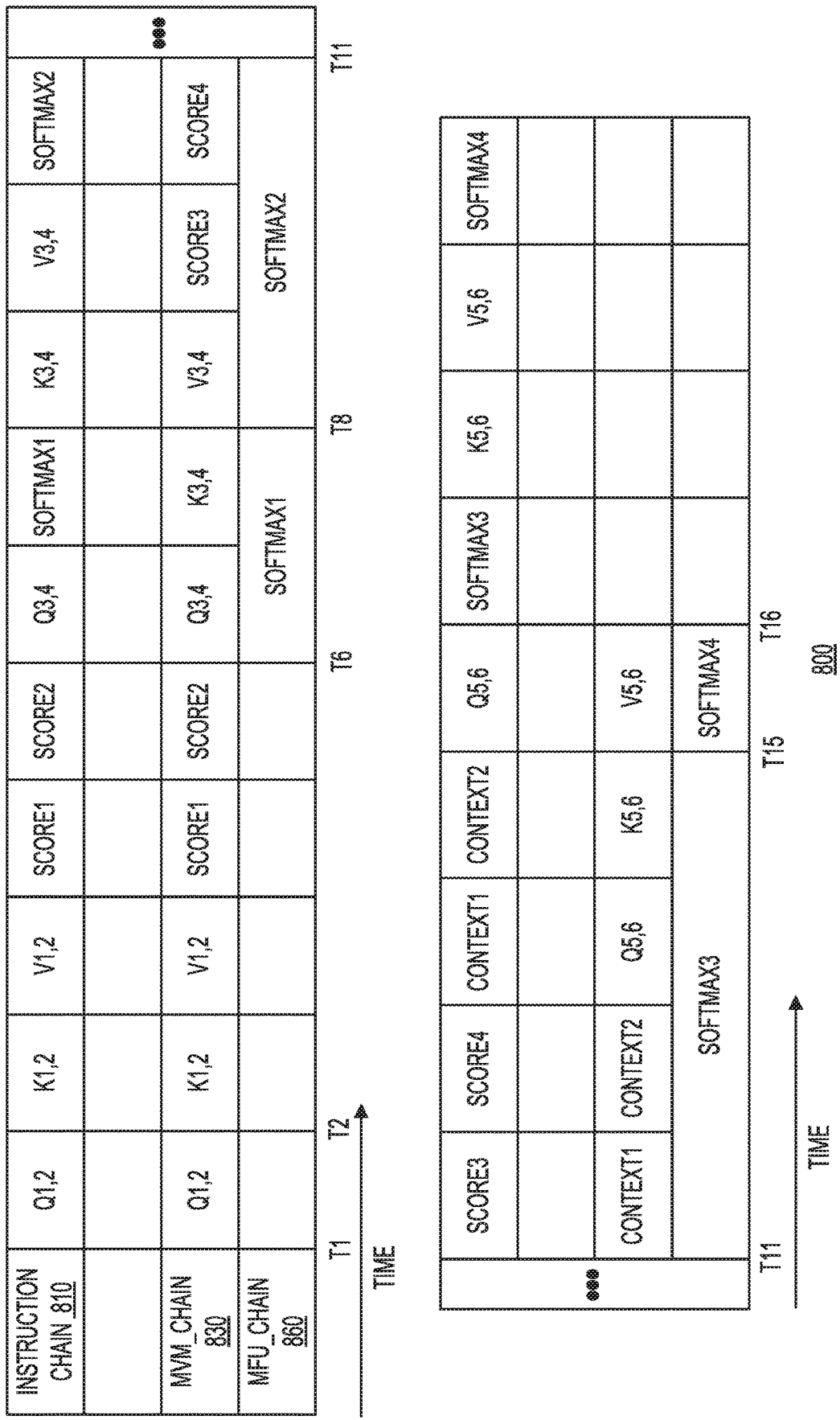
FIG. 8 is a timing diagram showing chained instructions, overlapped in time, for execution by a neural functional unit, in accordance with one example.

FIG. 8 is a timing diagram 800 showing chained instructions, overlapped in time, for execution by a neural functional unit in accordance with one example. These chained instructions may be executed using any of the DNN accelerators and NFUs described earlier. As an example, FIG. 8 shows overlap in time between two different classes of operations being performed by independent datapaths (e.g., datapath A 740 and datapath 760 of FIG. 7). This example relates to the operations performed as part of processing the attention sub-layers associated with the transformer layers of the BERT model. Instruction chain 810 is shown as being processed in a manner that certain instructions are chained together for processing as part of MVM_CHAIN 830 and other instructions are chained together for processing as part of MFU_CHAIN 860. As explained earlier, an instruction dispatcher associated with an NFU (e.g., instruction dispatcher 780 of FIG. 7) may take the instructions stored as part of an instruction queue (e.g., instruction queue 770 of FIG. 7) and dispatch the instructions to be executed as part of one chain or the other chain. As explained earlier, the two chains of instructions may be processed in parallel by the independent datapaths (e.g., datapath A 740 and datapath B 760).

With continued reference to FIG. 8, thus, in this example, between time instances T1 and T2, datapath A 740 may perform a first class of operations (e.g., matrix operations) related to the queries. During this time, datapath B 760 may be idle. However, between time instances T6 and T8, the first class of operations and the second class of operations may be overlapped by the NFU (e.g., NFU 700). Thus, in this example, between time instances T6 and T8, datapath A 740 may perform linear operations (e.g., matrix operations) related to the queries and the keys, and datapath B 760 may perform nonlinear operations (e.g., softmax1). Similarly, between time instances T8 and T11, datapath A 740 may perform linear operations (e.g., matrix operations) related to the values and scoring of sentences (e.g., score 3 and score 4), and datapath B 760 may perform nonlinear operations (e.g., softmax2). Moreover, between time instances T11 and T15, datapath A 740 may perform linear operations (e.g., evaluating context, such as context1 and context2) and other linear operations (e.g., a matrix operation) related to the queries and keys, and datapath B 760 may perform nonlinear operations (e.g., softmax3). Finally, as shown in FIG. 8, between time instances T15 and T16, datapath A 740 may perform linear operations (e.g., matrix operations) related to the values, and datapath B 760 may perform nonlinear operations (e.g., softmax4). Although FIG. 8 shows a certain number of operations being performed using a certain number of chains, additional or fewer operations may be performed using a different number of chains.

Figure 9:
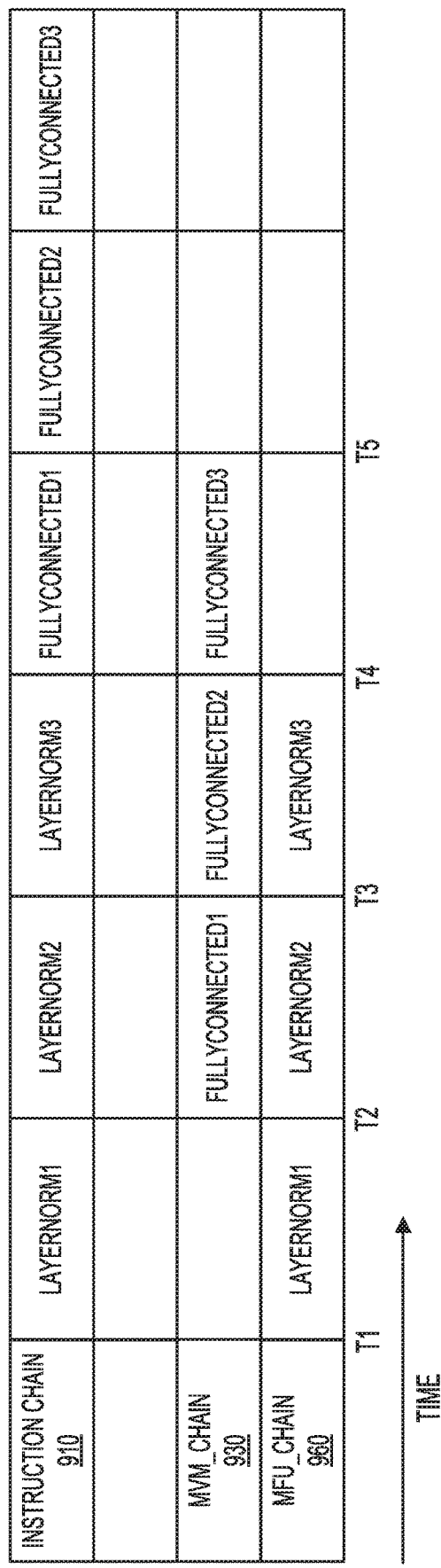
FIG. 9 is another timing diagram showing chained instructions overlapped in time, for execution by a neural functional unit, in accordance with one example.

FIG. 9 is another timing diagram 900 showing chained instructions, overlapped in time, for execution by a neural functional unit in accordance with one example. These chained instructions may be executed using any of the DNN accelerators and NFUs described earlier. As an example, FIG. 9 shows overlap in time between linear operations and nonlinear operations being performed by independent datapaths (e.g., datapath A 740 and datapath 760 of FIG. 7). This example relates to the operations performed as part of processing the fully-connected feed-forward networks and normalization layers associated with the encoder and decoder layers of the BERT model. Instruction chain 910 is shown as being processed in a manner that certain instructions are chained together for processing as part of MVM_CHAIN 930 and other instructions are chained together for processing as part of MFU_CHAIN 960. As explained earlier, in one example, an instruction dispatcher associated with an NFU (e.g., instruction dispatcher 780 of FIG. 7) may obtain the instructions from an instruction queue (e.g., instruction queue 770 of FIG. 7) and dispatch the instructions to be executed as part of one chain or the other chain. As explained earlier, the two chains of instructions may be processed in parallel by the independent datapaths (e.g., datapath A 740 and datapath B 760). Table 3 shows example firmware pseudocode for scheduling of the instructions by an instruction dispatcher (e.g., instruction dispatcher 780 of FIG. 7).

TABLE 3

```
def layernorm_fc(x):
    for i, x in range(seq_len):
        h[i] = layerNorm(x[i], MFU_IVRF, MVM_IVRF)
        h[i] = GELU(linear(h[i], MVM_IVRF, MFU_IVRF))
    return h
```

With continued reference to FIG. 9, thus, in this example, in response to the instructions shown in Table 3, between time instances T1 and T2, datapath B 760 may perform the second class of operations (e.g., layer normalization operations). During this time, datapath A 740 may be idle. However, between time instances T2 and T3 and time instances T3 and T4 the first class of operations and the second class of operations may be overlapped by the NFU (e.g., NFU 700). Thus, in this example, between time instances T2 and T3, datapath A 740 may perform linear operations (e.g., matrix operations) related to a fully connected feed-forward layer (e.g., fullyconnected1), and datapath B 760 may perform nonlinear operations (e.g., layernorm2). Similarly, between time instances T3 and T4, datapath A 740 may perform linear operations (e.g., matrix operations) related to the a fully connected feed-forward layer (e.g., fullyconnected2), and datapath B 760 may perform nonlinear operations (e.g., layernorm3). Finally, between time instances T4 and T5, datapath A 740 may perform linear operations (fullyconnected3). During this time, datapath B 760 may be idle. Although FIG. 9 shows a certain number of operations being performed using a certain number of chains, additional or fewer operations may be performed using a different number of chains.

Figure 10:
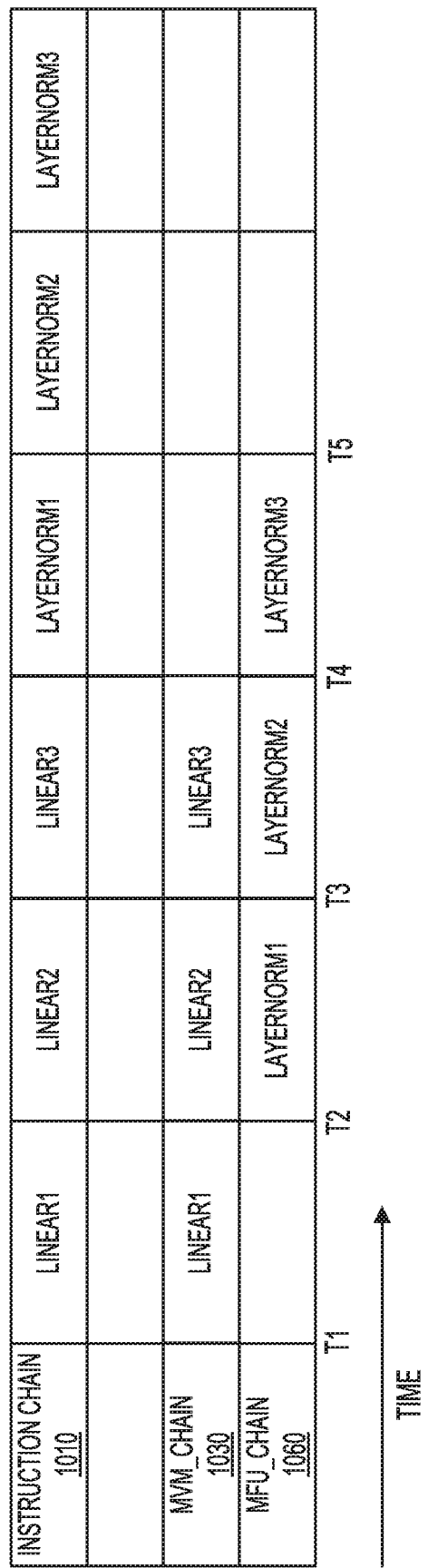
FIG. 10 is another timing diagram showing chained instructions overlapped in time, for execution by a neural functional unit, in accordance with one example.

FIG. 10 is another timing diagram 1000 showing chained instructions, overlapped in time, for execution by a neural functional unit in accordance with one example. These chained instructions may be executed using any of the DNN accelerators and NFUs described earlier. As an example, FIG. 10 shows overlap in time between at least two classes of operations being performed by independent datapaths (e.g., datapath A 740 and datapath 760 of FIG. 7). This example relates to the inference operations performed as part of processing the feed-forward layers of the BERT model. Instruction chain 1010 is shown as being processed in a manner that certain instructions are chained together for processing as part of MVM_CHAIN 1030 and other instructions are chained together for processing as part of MFU_CHAIN 1060. As explained earlier, in one example, an instruction dispatcher associated with an NFU (e.g., instruction dispatcher 780 of FIG. 7) may obtain the instructions stored as part of an instruction queue (e.g., instruction queue 770 of FIG. 7) and dispatch the instructions to be executed as part of one chain or the other chain. As explained earlier, the two chains of instructions may be processed in parallel by the independent datapaths (e.g., datapath A 740 and datapath B 760). Table 4 shows example firmware pseudocode for scheduling of the instructions by an instruction dispatcher (e.g., instruction dispatcher 780 of FIG. 7).

TABLE 4

```
def linear_layernorm(x):
    for i, x in range(seq_len):
        h[i] = linear(x[i], MVM_IVRF, MFU_IVRF)
        h[i] = layerNorm(h[i], MFU_IVRF, MVM_IVRF)
    return h
```

With continued reference to FIG. 10, thus, in this example, in response to the instructions shown in Table 4, between time instances T1 and T2, datapath A 740 may perform a first class of operations (e.g., linear1). During this time, datapath B 760 may be idle. However, between time instances T2 and T3 and time instances T3 and T4 the first class of operations and the second class of operations may be overlapped by the NFU (e.g., NFU 700). Thus, in this example, between time instances T2 and T3, datapath A 740 may perform linear operations (e.g., linear2) and datapath B 760 may perform nonlinear operations (e.g., layernorm1). Similarly, between time instances T3 and T4, datapath A 740 may perform linear operations (e.g., linear3) and datapath B 760 may perform nonlinear operations (e.g., layernorm2). Finally, between time instances T4 and T5, datapath B 760 may perform nonlinear operations (e.g., layernorm3). During this time, datapath A 740 may be idle. Although FIG. 10 shows a certain number of operations being performed using a certain number of chains, additional or fewer operations may be performed using a different number of chains.

Figure 11:
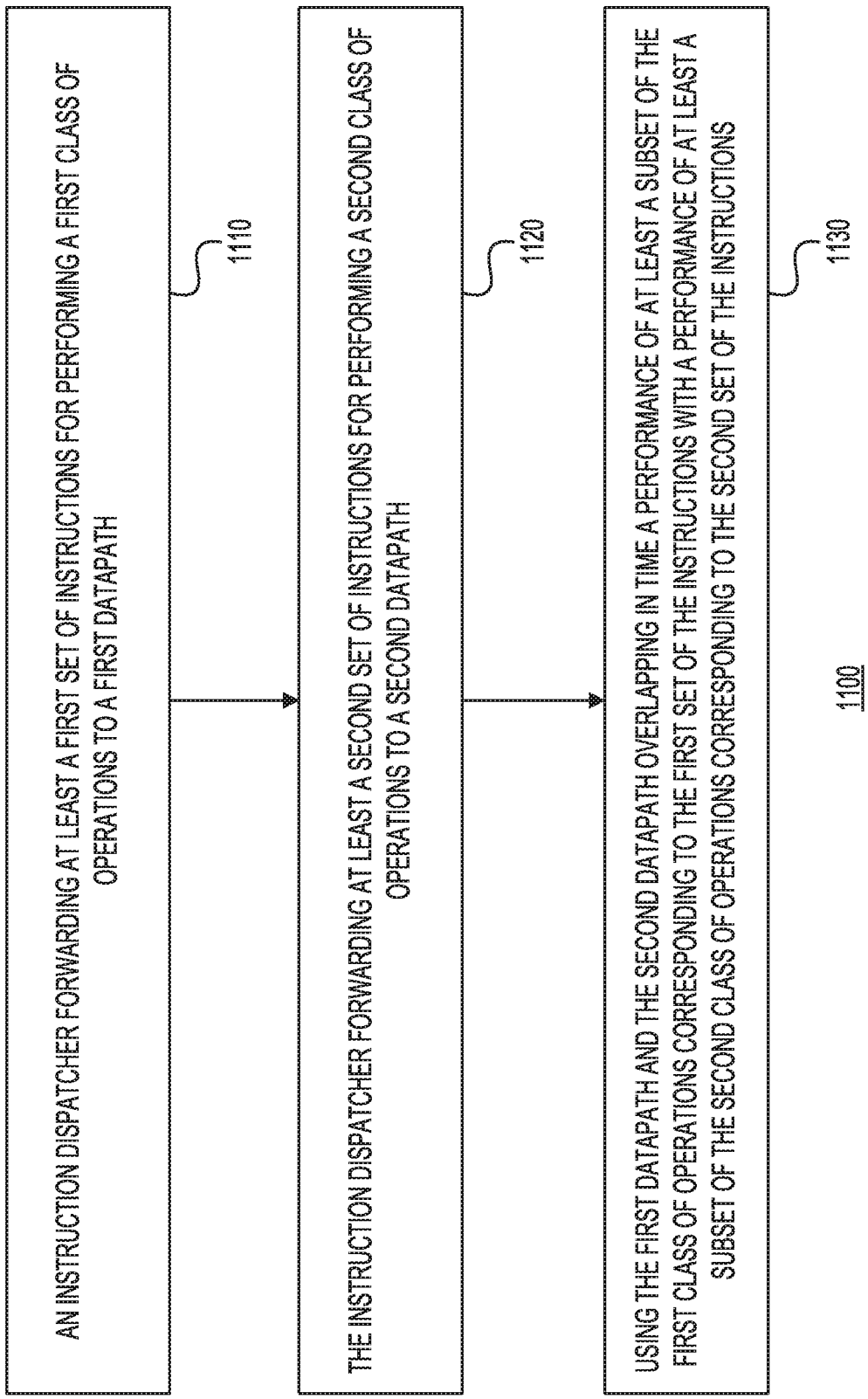
FIG. 11 shows a flow diagram of a method for processing instructions in accordance with one example.

FIG. 11 shows a flow diagram 1100 of a method for processing instructions in accordance with one example. In one example, the method may be performed using any of the DNN accelerators including any of the NFUs described earlier. As an example, the method may be performed in a deep neural network (DNN) accelerator (e.g., 500 of FIG. 5) including an instruction dispatcher (e.g., instruction dispatcher 780 of FIG. 7) configured to receive one or more chains of instructions. The at least one of one or more chains of instructions (e.g., the chain of instructions shown in Table 2) may include both instructions for performing a first class of operations corresponding to a neural network model (e.g., at least one layer of the BERT model) and instructions for performing a second class of operations corresponding to the neural network model. The NFU (e.g., NFU 600 of FIG. 6) corresponding to the DNN accelerator may include a first datapath (e.g., datapath 640 of FIG. 6) comprising at least one matrix register file (e.g., MRF 644 of FIG. 6) and at least one matrix vector multiplier (e.g., MVM 648 of FIG. 6), a second datapath (e.g., datapath 660 of FIG. 6), different from the first datapath comprising at least one vector register file (e.g., MFU_IVRF 662 of FIG. 6) and at least one function unit (e.g., MFU: ADD/MULTIPLY 672 of FIG. 6). configured to perform at least one nonlinear operation. Each of the first datapath and the second datapath may be configured to execute at least one instruction chain locally before outputting any results. The method may include a step (e.g., step 1110) including the instruction dispatcher forwarding at least a first set of instructions for performing a first class of operations to the first datapath. As an example, this step may include the instruction dispatcher forwarding the set of instructions in MVM_CHAIN 830 of FIG. 8 to datapath A 740 of FIG. 7. Prior to forwarding the instructions, the instruction dispatcher may split the instruction chain (e.g., instruction chain 810 of FIG. 8) into at least two sets of instructions.

The method may further include a step (e.g., step 1120) including the instruction dispatcher forwarding at least a second set of instructions for performing the second class of operations to the second datapath. As an example, this step may include the instruction dispatcher forwarding the set of instructions in MFU_CHAIN 860 of FIG. 8 to datapath B 760 of FIG. 7.

The next step (e.g., step 1130) may include using the first datapath and the second datapath overlapping in time a performance of at least a subset of the first class of operations corresponding to the first set of the instructions with a performance of at least a subset of the second class of operations corresponding to the second set of the instructions. As an example, as part of this step, as shown in FIG. 8, between time instances T6 and T8 linear operations corresponding to certain queries and values may be overlapped with nonlinear operations corresponding to the softmax function. Although FIG. 11 describes the performance of the method in relation to the BERT model, the method may be used with any other neural network model that includes the performance of multiple classes of operations.

In conclusion, the present disclosure relates to a deep neural network (DNN) accelerator including an instruction dispatcher configured to receive one or more chains of instructions, where at least one of one or more chains of instructions includes both instructions for performing a first class of operations corresponding to a neural network model and instructions for performing a second class of operations corresponding to the neural network model. The DNN accelerator may further include a first datapath comprising at least one matrix register file and at least one matrix vector multiplier. The DNN accelerator may further include a second datapath, different from the first datapath, comprising at least one vector register file and at least one function unit, where each of the first datapath and the second datapath is configured to execute at least one instruction chain locally before outputting any results, and where the instruction dispatcher is configured to forward at least a first set of instructions for performing the first class of operations to the first datapath and forward at least a second set of instructions for performing the second class of operations to the second datapath, and where the first datapath and the second datapath are configured to overlap in time a performance of at least a subset of the first class of operations corresponding to the first set of the instructions with a performance of at least a subset of the second class of operations corresponding to the second set of the instructions.

The first class of operations may comprise matrix-matrix multiply operations or matrix-vector multiply operations, and the second class of operations may comprise activation operations, softmax operations, or layer normalization operations. The first datapath may be coupled to the second datapath via a first local switch, and the first local switch may be configured to forward at least one intermediate result generated from a performance of any operations, using the first datapath, corresponding to a first instruction chain to the second datapath. The second datapath may be coupled to the first datapath via a second local switch, and the second local switch may be configured to forward at least one intermediate result generated from a performance of any operations, using the second datapath, corresponding to a second instruction chain to the first datapath.

An instruction chain may comprise a set of single-instruction-multiple-data (SIMD) instructions arranged as a single thread, and the single thread may start with a read instruction and end with a write instruction. The first datapath may be coupled to at least a first local memory and the second datapath may be coupled to at least a second local memory, and the first datapath may be configured to perform operations without accessing the at least the second local memory and the second datapath may be configured to perform operations without accessing the at least the first local memory. The neural network model may comprise a transformer-based model.

In another example, the present disclosure relates to method in a deep neural network (DNN) accelerator including an instruction dispatcher configured to receive one or more chains of instructions, where at least one of one or more chains of instructions includes both instructions for performing a first class of operations corresponding to a neural network model and instructions for performing a second class of operations corresponding to the neural network model, a first datapath comprising at least one matrix register file and at least one matrix vector multiplier, a second datapath, different from the first datapath comprising at least one vector register file and at least one function unit, where each of the first datapath and the second datapath is configured to execute at least one instruction chain locally before outputting any results. The method may include the instruction dispatcher forwarding at least a first set of instructions for performing the first class of operations to the first datapath. The method may further include the instruction dispatcher forwarding at least a second set of instructions for performing the second class of operations to the second datapath. The method may further include using the first datapath and the second datapath overlapping in time a performance of at least a subset of the first class of operations corresponding to the first set of the instructions with a performance of at least a subset of the second class of operations corresponding to the second set of the instructions.

The first class of operations may comprise matrix-matrix multiply operations or matrix-vector multiply operations, and the second class of operations may comprise activation operations, softmax operations, or layer normalization operations. The first datapath may be coupled to the second datapath via a first local switch, and the method may further comprise the first local switch forwarding at least one intermediate result generated from a performance of any operations, using the first local datapath, corresponding to a first instruction chain to the second datapath. The second datapath may be coupled to the first datapath via a second local switch, and the method may further comprise the second local switch forwarding at least one intermediate result generated from a performance of any operations, using the second datapath, corresponding to a second instruction chain to the first datapath.

An instruction chain may comprise a set of single-instruction-multiple-data (SIMD) instructions arranged as a single thread, and where the single thread may start with a read instruction and end with a write instruction. The first datapath may be coupled to at least a first local memory and the second datapath may be coupled to at least a second local memory, and the first datapath may be configured to perform operations without accessing the at least the second local memory and the second datapath may be configured to perform operations without accessing the at least the first local memory. The neural network model may comprise a transformer-based model.

In yet another example, the present disclosure relates to a deep neural network (DNN) accelerator including a first datapath comprising at least one matrix register file and at least one matrix vector multiplier. The DNN accelerator may further include a second datapath, different from the first datapath, comprising at least one vector register file and at least one function unit. The DNN accelerator may further include a switch coupled to both a first local memory associated with the first datapath and to a second local memory associated with the second datapath. The DNN accelerator may further include an instruction dispatcher configured: (1) to access one or more chains of instructions from at least one instruction queue, where at least one of one or more chains of instructions includes both instructions for performing a first class of operations corresponding to a neural network model and instructions for performing a second class of operations corresponding to the neural network model and (2) to split the at least one or more chains of instructions into a first chain comprising instructions for performing only the first class of operations and a second chain comprising instructions for performing only the second class of operations. The instruction dispatcher may further be configured to forward the first chain to the first datapath and forward the second chain to the second datapath, where the first datapath is configured to execute the first chain using the first local memory before outputting any results and the second datapath is configured to execute the second chain using the second local memory before outputting any results, and where the first datapath and the second datapath are further configured to overlap in time a performance of at least a subset of the first class of operations corresponding to the first chain with a performance of at least a subset of the second class of operations corresponding to the second chain.

The first class of operations may comprise matrix-matrix multiply operations or matrix-vector multiply operations, and the second class of operations may comprise activation operations, softmax operations, or layer normalization operations. The switch may be configured to forward at least one intermediate result generated from a performance of any operations, using the first datapath, corresponding to a first instruction chain to the second datapath. The switch may be configured to forward at least one intermediate result generated from a performance of any operations, using the second datapath, corresponding to a second instruction chain to the first datapath.

An instruction chain may comprise a set of single-instruction-multiple-data (SIMD) instructions arranged as a single thread, and the single thread may start with a read instruction and end with a write instruction. The neural network model may comprise a transformer-based model.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs). Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A hardware logic device that comprises a deep neural network (DNN) accelerator, wherein the hardware logic device has a neural functional unit including a first datapath, a first local memory that is dedicated to the first datapath, a first local switch that is coupled to the first local memory, a second datapath, a second local memory that is dedicated to the second datapath, and a second local switch that is coupled to the second local memory,
where the hardware logic device is configured to perform acts comprising:
receiving a chain of instructions, wherein the chain of instructions includes:
first instructions for performing matrix operations corresponding to a neural network; and
second instructions for performing vector operations corresponding to the neural network;
forwarding the first instructions to the first datapath that includes a matrix register file and a matrix vector multiplier, wherein the matrix vector multiplier is configured to perform a matrix-vector multiply operation based upon the first instructions and the matrix register file, and further wherein the first instructions are forwarded to the first datapath due to the first instructions being for performing the matrix operations; and
forwarding the second instructions to the second datapath that includes a vector register file and a function unit, wherein the function unit is configured to perform a vector operation based upon the second instructions and the vector register file, wherein the second instructions are forwarded to the second datapath due to the second instructions being for performing the vector operations, and further wherein the matrix processing unit performs the matrix operation in parallel with the vector processing unit performing the vector operation, and further wherein:
the first datapath is coupled to the second datapath via the first local switch, the first local switch is configured to forward a first result generated from the matrix vector multiplier to the second local switch, where the second local switch places the first result in the second local memory; and
the second datapath is coupled to the first datapath via the second local switch, the second local switch is configured to forward a second result generated from the function unit to the first local switch, where the first local switch places the second result in the first local memory.

2. The hardware logic device of claim 1, wherein the vector operation is one of an activation operation, softmax operation, or layer normalization operation.

3. The hardware logic device of claim 1, wherein an instruction chain comprises a set of single-instruction-multiple-data (SIMD) instructions arranged as a single thread, and wherein the single thread starts with a read instruction and ends with a write instruction.

4. The hardware logic device of claim 1, wherein the first datapath is configured to perform operations without accessing the second local memory and the second datapath is configured to perform operations without accessing the first local memory.

5. The hardware logic device of claim 4, wherein the neural network is a transformer-based neural network.

6. The hardware logic device of claim 1 being a field programmable gate array (FPGA).

7. The hardware logic device of claim 1, where the DNN is a transformer-based model.

8. The hardware logic device of claim 1, where the neural functional unit includes four datapaths, where each datapath is coupled to a dedicated local memory.

9. The hardware logic device of claim 1, where the hardware logic device is implemented in a cloud computing scenario.

10. A method performed by a hardware logic device that comprises a deep neural network (DNN) accelerator, wherein the hardware logic device has a neural functional unit including a first datapath, a first local memory that is dedicated to the first datapath, a first local switch that is coupled to the first local memory, a second datapath, a second local memory that is dedicated to the second datapath, and a second local switch that is coupled to the second local memory, the method comprising:
receiving first instructions for performing a matrix-vector multiply operation corresponding to a neural network;
receiving second instructions for performing a vector operation corresponding to the neural network model;
forwarding the first instructions to the first datapath, wherein the first datapath includes a matrix register file and matrix-vector multiplier, and further wherein the first instructions are forwarded to the first datapath due to the first instructions being for performing the matrix operation;

forwarding the second instructions to the second datapath that is different from the first datapath, wherein the second datapath includes a vector register file and a function unit, and further wherein the second instructions are forwarded to the second datapath rather than the first datapath due to the second instructions being for performing the vector operation;

performing, by the matrix-vector multiplier in the first datapath, the matrix-vector multiply operation based upon the first instructions and the matrix register file; and performing, by the function unit in the second datapath, the vector operation based upon the vector register file and the second instructions, where the matrix-vector multiplier performs the matrix operation in parallel with the function unit performing the vector operation, and further wherein:

the first datapath is coupled to the second datapath via the first local switch, the first local switch is configured to forward a first result generated from the matrix vector multiplier to the second local switch, where the second local switch places the first result in the second local memory; and the second datapath is coupled to the first datapath via the second local switch, the second local switch is configured to forward a second result generated from the function unit to the first local switch, where the first local switch places the second result in the first local memory.

11. The method of claim 10, wherein the vector operation is one of an activation operation, a softmax operation, or layer normalization operation.

12. The method of claim 10, wherein an instruction chain comprises a set of single-instruction-multiple-data (SIMD) instructions arranged as a single thread, and wherein the single thread starts with a read instruction and ends with a write instruction.

13. The method of claim 10, wherein the first datapath is coupled to a first local memory and the second datapath is coupled to a second local memory, and wherein the first datapath is configured to perform operations without accessing the second local memory and the second datapath is configured to perform operations without accessing the first local memory.

14. The method of claim 13, wherein the neural network is a transformer-based neural network.

15. A hardware logic device comprising a deep neural network (DNN) accelerator, wherein the hardware logic device has a neural functional unit including a first datapath, a first local memory that is dedicated to the first datapath, a first local switch that is coupled to the first local memory, a second datapath, a second local memory that is dedicated to the second datapath, and a second local switch that is coupled to the second local memory, the DNN accelerator comprising:

a first datapath comprising a matrix register file and a matrix vector multiplier;

a second datapath, different from the first datapath, comprising a vector register file and a function unit;

a local switch coupled to both a first local memory associated with the first datapath and to a second local memory associated with the second datapath;

an instruction dispatcher configured to:
  access a chain of instructions from an instruction queue, wherein the chain of instructions includes:
    first instructions for performing matrix-vector multiply operations corresponding to a neural network; and
    second instructions for performing vector operations corresponding to the neural network; and
  split the chain of instructions into:
    a first chain comprising instructions for performing only the matrix-vector operations; and
    a second chain comprising instructions for performing only the vector operations;
  forward the first chain to the first datapath;
  forward the second chain to the second datapath, wherein the first datapath is configured to execute the matrix-vector multiply operations in the first chain based upon the matrix register file and using the first local memory, wherein the second datapath is configured to execute the vector operations in the second chain based upon the vector register file and using the second local memory, wherein the first datapath executes the matrix operations in parallel with the second datapath executing the vector operations,
  wherein the first datapath is coupled to the second datapath via the first local switch, the first local switch is configured to forward a first result generated from the matrix vector multiplier to the second local switch, where the second local switch places the first result in the second local memory; and
  wherein the second datapath is coupled to the first datapath via the second local switch, the second local switch is configured to forward a second result generated from the function unit to the first local switch, where the first local switch places the second result in the first local memory.

16. The hardware logic device of claim 15, wherein the vector operations comprise activation operations, softmax operations, or layer normalization operations.

17. The hardware logic device of claim 15, wherein an instruction chain comprises a set of single-instruction-multiple-data (SIMD) instructions arranged as a single thread, and wherein the single thread starts with a read instruction and ends with a write instruction.

18. The hardware logic device of claim 17, wherein the neural network is a transformer-based neural network.

19. The hardware logic device of claim 15 being a field programmable gate array (FPGA).

20. The hardware logic device of claim 15, where the DNN is a transformer-based model.

* * * * *